(12) United States Patent
Park et al.

(10) Patent No.: US 8,305,333 B2
(45) Date of Patent: Nov. 6, 2012

(54) BACKLIGHT ASSEMBLY, DISPLAY DEVICE HAVING THE SAME AND METHOD FOR ASSEMBLING THE BACKLIGHT ASSEMBLY

(75) Inventors: Jin-Hee Park, Cheonan-si (KR);
Yong-Woo Lee, Suwon-si (KR);
Seong-Sik Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 803 days.

(21) Appl. No.: 12/354,280

(22) Filed: Jan. 15, 2009

(65) Prior Publication Data
US 2009/0207125 A1 Aug. 20, 2009

(30) Foreign Application Priority Data
Feb. 18, 2008 (KR) .................. 2008-14326

(51) Int. Cl.
*G09G 3/36* (2006.01)
(52) U.S. Cl. .............. 345/102; 345/82; 345/39
(58) Field of Classification Search ............. None
See application file for complete search history.

(56) References Cited

U.S. PATENT DOCUMENTS
2009/0116222 A1* 5/2009 Hamada ............ 362/97.2

FOREIGN PATENT DOCUMENTS

| CN | 1635409 A | 7/2005 |
|---|---|---|
| JP | 2005-222903 A | 8/2005 |
| JP | 2006-285181 A | 10/2006 |
| JP | 2007-036132 A | 2/2007 |
| KR | 1020060007517 A | 1/2006 |
| WO | 2007/037037 A1 | 4/2007 |

OTHER PUBLICATIONS

European Search Report for Application No. 09000390.6-1228/2090924 dated Jan. 19, 2012.

* cited by examiner

*Primary Examiner* — Muhammad N Edun
(74) *Attorney, Agent, or Firm* — Cantor Colburn LLP

(57) ABSTRACT

A backlight assembly includes a receiving container, a plurality of light-emitting modules, a driving unit and a side mold. The receiving container includes a bottom plate and a side part formed on a peripheral edge portion of the bottom plate. Light-emitting modules of the plurality of light-emitting modules are disposed in the receiving container. The light-emitting modules include a light-emitting base board and a plurality of light-emitting diodes ("LEDs") disposed on a first side of the light-emitting base board. The driving unit is disposed in the receiving container proximate to a lower portion of the peripheral edge portion of the bottom plate. The driving unit is electrically connected to the light-emitting modules to control an operation of the plurality of LEDs. The side mold is disposed on the lower portion of the peripheral edge portion of the bottom plate and covers the driving unit.

24 Claims, 10 Drawing Sheets

BACKLIGHT ASSEMBLY, DISPLAY DEVICE HAVING THE SAME AND METHOD FOR ASSEMBLING THE BACKLIGHT ASSEMBLY

This application claims priority to Korean Patent Application No. 2008-14326, filed on Feb. 18, 2008, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly, a display device having the backlight assembly and a method for assembling the backlight assembly. More particularly, the present invention relates to a backlight assembly including a light-emitting diode ("LED") as a light source and a display device having the backlight assembly.

2. Description of the Related Art

Generally, a liquid crystal display ("LCD") device includes an LCD panel which displays an image controlling an optical transmissivity of light through liquid crystal. A backlight assembly disposed under the LCD panel provides light to the LCD panel.

Recently, to enhance color reproducibility and contrast ratio, for example, backlight assemblies have been developed to include light-emitting modules having light-emitting diodes ("LEDs"), a receiving container including a bottom plate and a side part to receive the light-emitting modules and a light source driving module which controls the light-emitting modules.

The light source driving module is typically disposed on an outer surface of the bottom plate, and is electrically connected to the light-emitting modules disposed in the receiving container using a plurality of wires. Wires of the plurality of wires pass through a wire hole formed through the bottom plate or the side part, and electrically connect the light source driving module to the light-emitting modules.

The light source driving module is typically disposed on an end portion of an outer face of the bottom plate, and the wires which pass through the wire hole therefore extend along an outer face of the side part to connect to the light source driving module. The wires which extend along the outer face of the side part are generally fixed to the side part using a fixing member such as a tape, for example. The tape may also be used to block the wire hole to prevent impurities from flowing into the receiving container.

The wires are electrically connected to connectors of the light-emitting modules disposed on two end portions of the receiving container, and extend outside the receiving container through the wire hole. Side molds are typically disposed on the end portions of the receiving container to cover the connectors.

Thus, as described above, several steps are required to electrically connect the light source driving module and the light-emitting modules using the wires, and a manufacturing efficiency is thereby reduced. Further, the wires, the fixing member and the side molds are required additional components, thereby increases manufacturing costs of the backlight assembly.

BRIEF SUMMARY OF THE INVENTION

Exemplary embodiments of the present invention obviate the abovementioned problems and thus, exemplary embodiments of the present invention provides a backlight assembly which does not require connection wires between a light source driving module and light-emitting modules, thereby reducing manufacturing costs and increasing a manufacturing efficiency of the backlight assembly.

The present invention also provides a display device having the above-mentioned backlight assembly.

In one exemplary embodiment of the present invention, a backlight assembly includes a receiving container, a plurality of light-emitting modules, a driving unit and a side mold.

The receiving container includes a bottom plate and a side part formed on a peripheral edge portion of the bottom plate. Light-emitting modules of the plurality of light-emitting modules are disposed in the receiving container. The light-emitting modules include a light-emitting base board and a plurality of light-emitting diodes ("LEDs") disposed on a first face, e.g., side, of the light-emitting base board. The driving unit is disposed in the receiving container proximate to a lower portion of the peripheral edge portion of the bottom plate and is electrically connected to the light-emitting modules to control an operation of the plurality of LEDs. The side mold is disposed on the lower portion of the peripheral edge portion of the bottom plate to cover the driving unit.

The light-emitting modules are disposed adjacent to each other along a first direction defined by a longitudinal axis of the receiving container. A longitudinal axis of the light-emitting modules is aligned in a second direction substantially perpendicular to the first direction, and the lower portion of the bottom plate is proximate to a lower peripheral portion of the longitudinal axis of the light emitting modules.

The driving unit may be disposed on the first side of the light-emitting base board and may be electrically connected to LEDs of the plurality of LEDs.

The backlight assembly may further include at least one module connecting unit disposed on first sides of adjacent light-emitting base boards to electrically connect the adjacent light-emitting base boards to each other. The at least one module connecting unit may be covered by the side mold.

In an exemplary embodiment, the module connecting unit may include wire connectors disposed on the first sides of the adjacent light-emitting base boards, and a connecting wire electrically connecting the wire connectors to each other. Alternatively, the module connecting unit may include a conductive connecting member in contact with metal patterns formed on the first sides of the adjacent light-emitting base boards to electrically connect the metal patterns to each other.

The backlight assembly may further include a connector disposed on a second side, opposite the first side, of at least one light-emitting base board and disposed in a connector aperture formed in the bottom plate to receive a driving signal for driving the driving unit. The connector may be disposed on the second side of a light-emitting base board disposed at an outermost peripheral position along the first direction of the receiving container.

The backlight assembly may further include a driving base board disposed on the lower portion of the peripheral edge portion of the bottom plate and board connecting units disposed on the driving base board. The driving unit may be disposed on a first side of the driving base board, and the driving base board may be electrically connected to the light-emitting modules by the board connecting units. The driving base board may be disposed on the bottom plate, and a longitudinal axis of the driving base board is aligned substantially in the first direction.

In an exemplary embodiment, each of the board connecting units may include a protruding portion protruding substantially parallel to the second direction from the light-emitting base board toward the driving base board, and a socket portion disposed on the driving base board to receive the protruding portion and electrically connected to the protruding portion. Alternatively, each of the board connecting units may include a protruding portion protruding substantially parallel to the second direction from the driving base board toward the light-emitting base board, and a socket portion disposed on the light-emitting base board to receive the protruding portion and electrically connected to the protruding portion.

The side opposite the first side of the driving base board and disposed in a connector aperture formed in the bottom plate to receive a driving signal for driving the driving unit.

The side part of the receiving container may include: a first sidewall formed at a first peripheral side of the bottom plate, a plane defined by the first peripheral side of the bottom plate being substantially perpendicular to a first direction defined by a longitudinal axis of the receiving container; a second sidewall formed at a second peripheral side the bottom plate opposite the first peripheral side thereof; a third sidewall formed at a third peripheral side of the bottom plate, a plane defined by the third peripheral side being substantially parallel to the first direction; and a fourth sidewall formed at a fourth peripheral side the bottom plate opposite the third peripheral side thereof, The fourth sidewall is formed proximate to the side mold, and a cross-section of the fourth sidewall comprises a substantially linear shape.

A cross-section of the first sidewall, the second sidewall and the third sidewall may include an approximately "U" shape.

A cross-section of the side mold may include an approximately "L" shape.

A shape of the bottom plate may have, for example, a substantially rectangular shape, and a length of the bottom plate in the first direction may be greater than a length of the bottom plate in the second direction.

The light-emitting base board may have, for example, a substantially rectangular shape, and a length of the light-emitting base board in the second direction may be greater than a length of the light-emitting base board in the first direction.

In an exemplary embodiment, the driving unit may include a current control section which controls a current supplied to the LEDs, and may further include a voltage changing section which changes a voltage provided from an external source to a driving voltage to apply the driving voltage to the LEDs.

In an alternative exemplary embodiment of the present invention, a display device includes a backlight assembly which generates light and a display panel which displays an image using the light generated from the backlight assembly.

The backlight assembly includes a receiving container, a plurality of light-emitting modules, a driving unit and a side mold. The receiving container includes a bottom plate and a side part formed on a peripheral edge portion of the bottom plate. Light-emitting modules of the plurality of light-emitting modules are disposed in the receiving container. The light-emitting modules include a light-emitting base board and a plurality of light-emitting diodes ("LEDs") disposed on a first face, e.g., side, of the light-emitting base board. The driving unit is disposed in the receiving container proximate to a lower portion of the peripheral edge portion of the bottom plate and is electrically connected to the light-emitting modules to control an operation of the plurality of LEDs. The side mold is disposed on the lower portion of the peripheral edge portion of the bottom plate to cover the driving unit.

The light-emitting modules may be disposed adjacent to each other along a first direction defined by a longitudinal axis of the receiving container. A longitudinal axis of the light-emitting modules is aligned in a second direction substantially perpendicular to the first direction, and the lower portion of the bottom plate is proximate to a lower peripheral portion of the longitudinal axis of the light emitting modules. The driving unit is disposed on the first side of the light-emitting base board and is electrically connected to light-emitting diodes of the plurality of light-emitting diodes.

The backlight assembly may further include at least one module connecting unit disposed on first sides of adjacent light-emitting base boards to electrically connect the adjacent light-emitting base boards to each other, and the at least one module connecting unit is covered by the side mold.

The side part may include: a first sidewall formed at a first peripheral side of the bottom plate, a plane defined by the first peripheral side of the bottom plate being substantially perpendicular to a first direction defined by a longitudinal axis of the receiving container; a second sidewall formed at a second peripheral side the bottom plate opposite the first peripheral side thereof; a third sidewall formed at a third peripheral side of the bottom plate, a plane defined by the third peripheral side being substantially parallel to the first direction; and a fourth sidewall formed at a fourth peripheral side the bottom plate opposite the third peripheral side thereof. The fourth sidewall may be formed proximate to the side mold, and a cross-section of the fourth sidewall may include a substantially linear shape.

A cross section of the first sidewall, the second sidewall and the third sidewall may include a substantially "U" shape.

According to exemplary embodiments of the present invention, a driving unit which controls an operation of LEDs is disposed in a receiving container to allow external wires to be omitted, thereby improving a manufacturing efficiency and reducing manufacturing costs of a backlight assembly and display device including the same.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
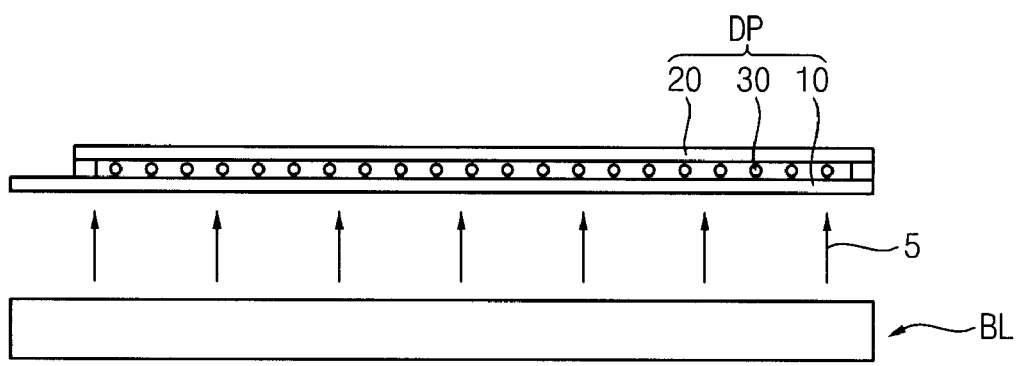
FIG. 1 is a partial cross-sectional view of a display device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a partial cross-sectional view of a display device according to an exemplary embodiment of the present invention.

Referring to FIG. 1, a display device according to an exemplary embodiment of the present invention includes a display panel DP which displays an image using light 5 and a backlight assembly BL disposed under the display panel DP to provide the light 5 to the display panel DP.

In an exemplary embodiment, the display panel DP includes a first substrate 10, a second substrate 20 facing, e.g., disposed opposite to, the first substrate 10, and a liquid crystal layer 30 interposed between the first substrate 10 and the second substrate 20.

The first substrate 10 includes gate lines and data lines (not shown) disposed in substantially perpendicular directions, e.g., crossing each other, thin-film transistors ("TFTs") (not shown) electrically connected to the gate lines and the data lines, and pixel electrodes (not shown) electrically connected to the TFTs.

The second substrate 20 according to an exemplary embodiment of the present invention includes color filters (not shown), formed substantially corresponding to each of the pixel electrodes, and a common electrode (not shown) formed on a surface of one of the first substrate 10 and the second substrate 20. The color filters may include, for example, red color filters, green color filters and/or blue color filters, but alternative exemplary embodiments are not limited thereto. In an alternative exemplary embodiment, the color filters may be included in the first substrate 10 instead of the second substrate 20.

The liquid crystal layer 30 is interposed between the first substrate 10 and the second substrate 20, and liquid crystal molecules (not shown) of the liquid crystal layer 30 are arranged by an electric field generated between each of the pixel electrodes and the common electrode. An optical transmissivity of the light 5 which passes through the liquid crystal layer 30 is determined based on the arrangement of the liquid crystal molecules, to thereby display an image.

The backlight assembly BL is disposed under the display panel DP to provide the light 5 to the display panel DP. The backlight assembly BL will be described later in further detail below.

The display device according to an exemplary embodiment of the present invention may further include an optical member (not shown) disposed between the backlight assembly BL and the display panel DP. The optical member may include, for example, a light diffusing plate, a prism sheet, a light diffusing sheet and/or a luminance enhancing sheet, but alternative exemplary embodiments are not limited thereto.

Figure 2:
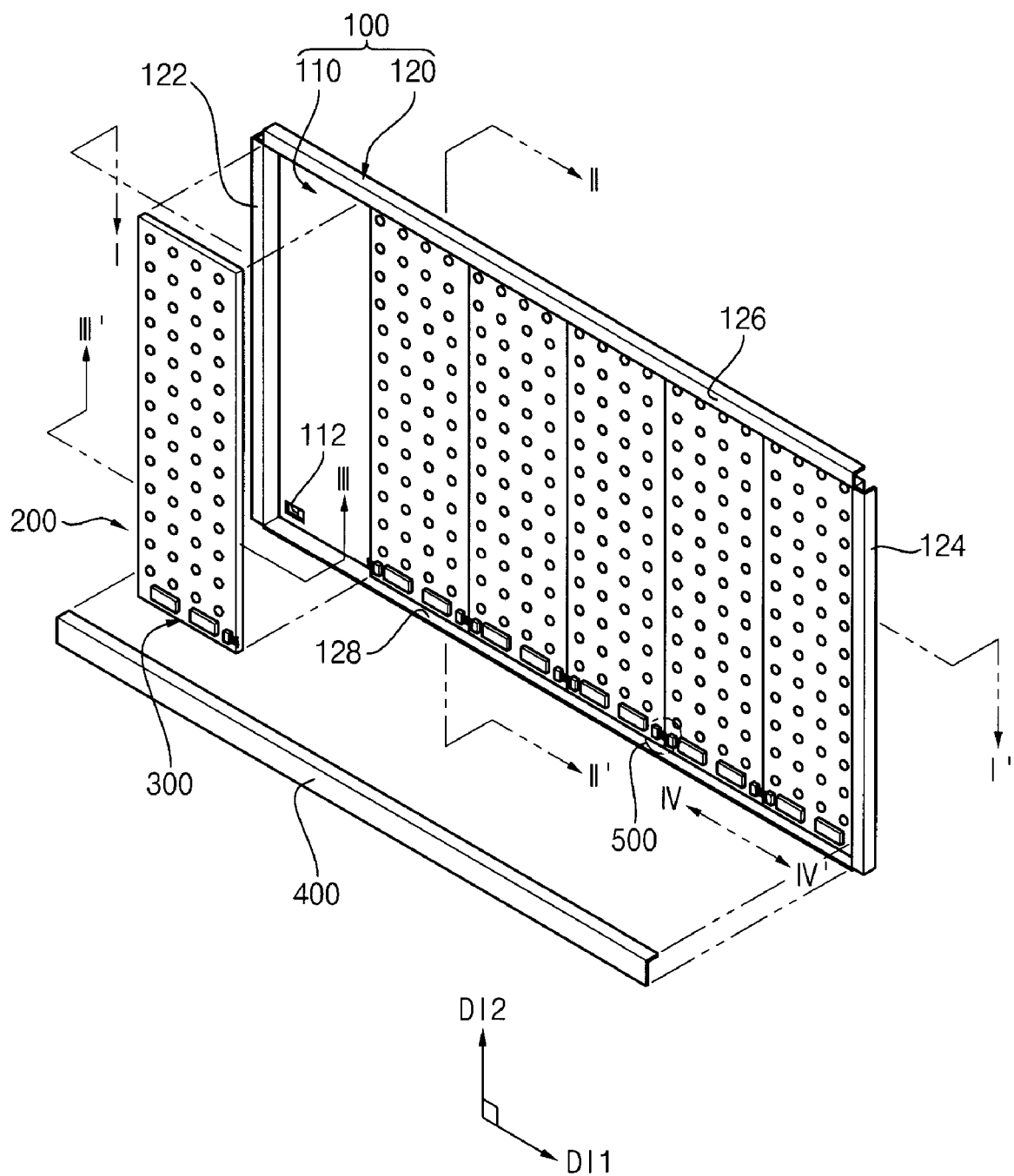
FIG. 2 is an exploded perspective view of a backlight assembly of the display device according to the exemplary embodiment of the present invention shown in FIG. 1.
Figure 3:
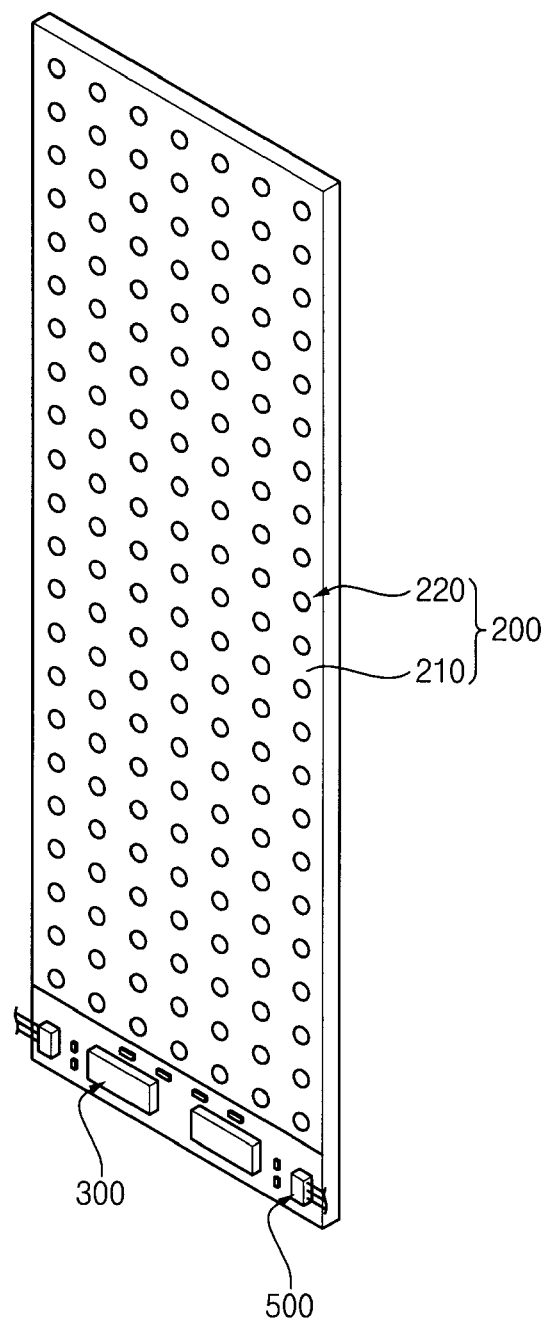
FIG. 3 is a perspective view of a light-emitting module of the backlight assembly according to the exemplary embodiment of the present invention shown in FIG. 2.

FIG. 2 is an exploded perspective view of a backlight assembly of the display device according to the exemplary embodiment of the present invention shown in FIG. 1. FIG. 3 is a perspective view of a light-emitting module of the backlight assembly according to the exemplary embodiment of the present invention shown in FIG. 2.

Referring to FIGS. 2 and 3, the backlight assembly DP includes a receiving container 100, a plurality of light-emitting modules 200, a plurality of driving units 300, a side mold 400 and at least one module connecting unit 500.

The receiving container 100 includes a bottom plate 110 and a side part 120 formed on a peripheral edge portion of the bottom plate 110, as shown in FIG. 2.

In an exemplary embodiment of the present invention, the bottom plate 110 has a substantially rectangular shape, in which a first length in a first direction DI1 is longer than a second length in a second direction DI2 substantially perpendicular to the first direction DI1.

The side part 120 includes first, second, third and fourth sidewalls 122, 124, 126 and 128, respectively, corresponding to four peripheral sides of the bottom plate 110, as shown in FIG. 2. More specifically, the first sidewall 122 and the second sidewall 124 are formed on opposite sides disposed at opposite end portions of the first length (aligned in the first direction DI1) of the bottom plate 110. The third sidewall 126 and the fourth sidewall 128 are formed on opposite sides disposed on opposite end portions of the second length (aligned in the second direction DI2) of the bottom plate 110, as shown in FIG. 2.

The light-emitting modules 200 are received in, e.g., are disposed in, the receiving container 100, and are aligned longitudinally in the second direction DI2 and are further disposed in rows substantially along the first direction DI1, as shown in FIG. 2. In an exemplary embodiment, a quantity of the light-emitting modules 200 may be six, as shown in FIG. 2, but alternative exemplary embodiments are not limited thereto. For example, an alternative exemplary embodiment of the present invention, includes eight light-emitting modules 200, but is not limited thereto.

Each of the light-emitting modules 200 includes a light-emitting base board 210 and a plurality of light-emitting diodes ("LEDs") 220 disposed on a first face, e.g., a first side, of the light-emitting base board 210. The light-emitting base board 210 according to an exemplary embodiment of the present invention has a substantially rectangular shape, in which a length in the second direction DI2 is longer than a length in the first direction DI1. LEDs 220 of the plurality of LEDs 220 may be arranged on the first face, e.g., the first side, of the light-emitting base board 210 in a substantially matrix shape, and may further be spaced apart from each other at regular intervals.

The LEDs 220 according to an exemplary embodiment include red LEDs, green LEDs and blue LEDs, and, alternatively, may include white LEDs. For example, at least one red LED, at least one green LED and at least one blue LED may be disposed adjacent to each other to form a light-emitting block which generates a white light, but alternative exemplary embodiments are not limited thereto.

The driving units 300 are disposed on each of the first faces of the light-emitting base boards 210, and are electrically connected to the LEDs 220. The driving units 300 control an operation of the LEDs 220.

The driving units 300 are disposed on a peripheral end portion having a longitudinal axis thereof aligned in the second direction DI2 of the first face of the light-emitting base board 210. In other words, the driving units 300 are disposed adjacent to the fourth sidewall 128, as shown in FIG. 2.

The side mold 400 is disposed on a peripheral end portion having a longitudinal axis thereof aligned in the second direction DI2 of the bottom plate 110 to cover the driving units 300, e.g., proximate to the driving units 300. Thus, the side mold 400 according to an exemplary embodiment faces the fourth sidewall 128, and covers the driving units 300. In an exemplary embodiment of the present invention, the side mold 400 has an L-shape to cover the driving units 300, as shown in FIG. 2, but alternative exemplary embodiments are not limited thereto. Further, an inclined portion of the side mold 400 facing the light-emitting modules 200 may be externally inclined, e.g., may angle away from the bottom plate 110.

Referring to FIGS. 2 and 3, the module connecting units 500 are disposed on the first faces of respective adjacent light-emitting base boards 210 to electrically connect the respective adjacent light-emitting base boards 210 to each other. In an exemplary embodiment of the present invention, a quantity of the module connecting units 500 may be less than a quantity of the light-emitting modules 200 by one. Specifically, when the quantity of the light-emitting modules 200 is six, the quantity of the module connecting units 500 may be five, as shown in FIG. 2. It will be noted, however, that alternative exemplary embodiments are not limited to the abovementioned configuration.

The module connecting units 500 are disposed on the peripheral end portion having a longitudinal axis thereof aligned in the second direction DI2 of the first faces of the light-emitting base boards 210, e.g., adjacent to the fourth sidewall 128 and proximate to the driving units 300. Thus, the module connecting units 500 are covered by the side mold 400 in the backlight assembly according to an exemplary embodiment of the present invention.

Figure 4:
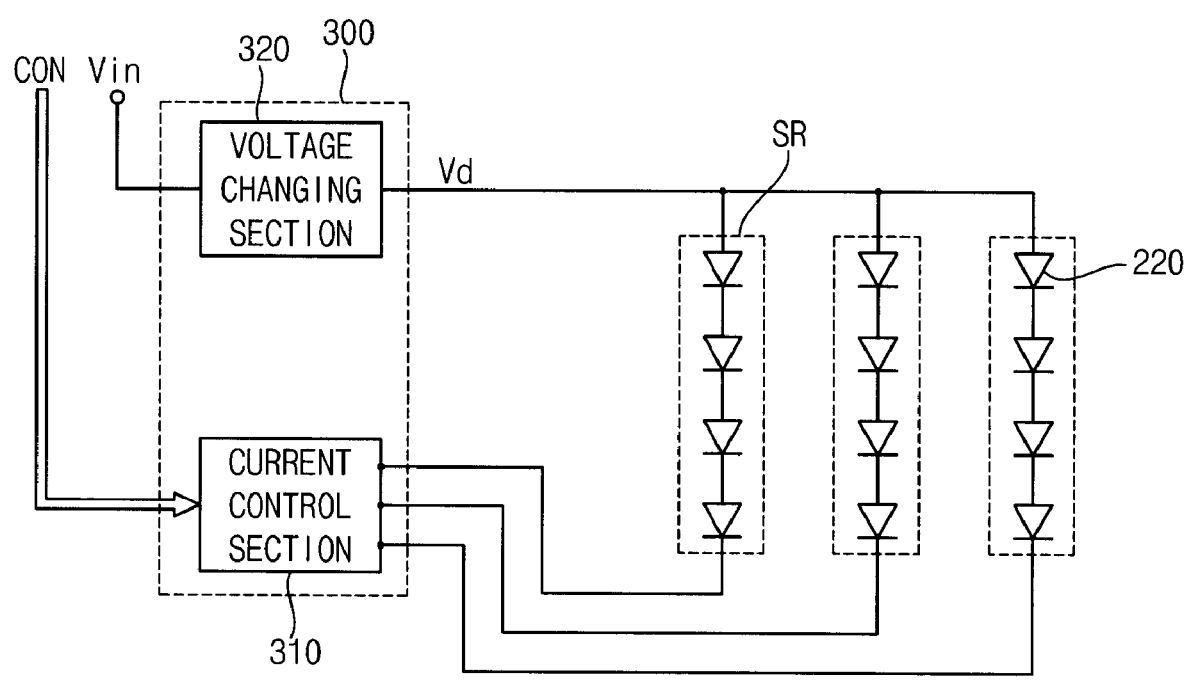
FIG. 4 is a schematic circuit diagram illustrating electrical connections between a driving unit and a light-emitting diode ("LED") of the light-emitting module according to the exemplary embodiment of the present invention shown in FIG. 3.

FIG. 4 is a schematic circuit diagram illustrating electrical connections between a driving unit and an LED of the light-emitting module according to the exemplary embodiment of the present invention shown in FIG. 3.

Referring now to FIG. 4, the driving unit 300 receives a driving signal including a control signal CON and an external voltage Vin from the module connecting unit 500 (see FIGS. 2 and 3). The driving unit 300 controls operation of the LEDs 220 in response to the driving signal. In an exemplary embodiment, the driving unit 300 includes a current control section 310 and a voltage changing section 320.

The current control section 310 controls driving currents applied to the LEDs 220 in response to the control signal CON provided from the module connecting unit 500. The control signal CON according to an exemplary embodiment includes pulse width modulation ("PWM") signals capable of controlling applying timings of the driving currents, but alternative exemplary embodiments are not limited thereto.

The LEDs 220 may be grouped in predetermined numbers to form a plurality of light-emitting strings SR. The LEDs 220 of each light-emitting string SR of the plurality of light-emitting strings SR are electrically connected to each other in series, while each light-emitting string SR is connected in parallel with other light-emitting strings SR of the plurality of the plurality of light-emitting strings SR, as shown in FIG. 4.

The current control section 310 may control driving currents applied to the light-emitting strings SR. Further, the current control section 310 according to an exemplary embodiment may include a current control element (not shown) having multiple channels electrically connected to the light-emitting strings SR, to independently control the driving currents applied to the light-emitting strings SR. Alternatively, the current control section 310 may include a plurality of current control elements, each of which is electrically connected to an associated light-emitting string SR to control an associated driving current thereof.

The voltage changing section 320 changes the external voltage Vin provided from the module connecting unit 500 to a driving voltage Vd. In an exemplary embodiment, the voltage changing section 320 may include a direct current-to-direct current ("DC-to-DC") converter, and the driving voltage Vd may correspond to a DC voltage formed by converting, e.g., boosting, the external voltage Vin.

As shown in FIG. 4, the voltage changing section 320 is electrically connected to the light-emitting strings SR, and thereby to the LEDs 220, to apply the driving voltage Vin to the LEDs 220. In an exemplary embodiment, the voltage changing section 320 is electrically connected to an end of each of the light-emitting strings SR to apply the driving voltage Vd to each of the light-emitting strings SR.

In an alternative exemplary embodiment of the present invention, the voltage changing section 320 may not be disposed in the driving unit 300. For example, in an alternative exemplary embodiment, the voltage changing section 320 may be disposed outside, e.g., external to, the receiving container 100 (FIG. 2) to apply the driving voltage Vd to the LEDs 220.

Figure 5:
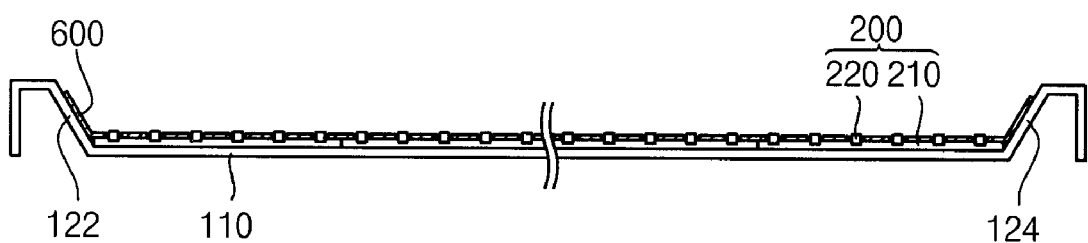
FIG. 5 is a partial cross-sectional view taken along line I-I' in FIG. 2.
Figure 6:
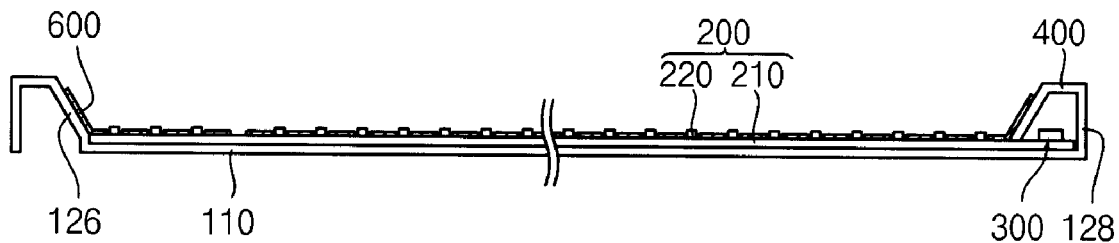
FIG. 6 is a partial cross-sectional view taken along line II-II' in FIG. 2.

FIG. 5 is a partial cross-sectional view taken along line I-I' in FIG. 2. FIG. 6 is a partial cross-sectional view taken along line II-II' in FIG. 2.

Referring to FIGS. 2, 5 and 6, the first sidewall 122 and the second sidewall 124 are formed at opposite end portions of a longitudinal axis aligned in the first direction DI1 of the bottom plate 110. In other words, the first sidewall 122 and the second sidewall 124 are disposed on each of two shorter ends of a rectangle defined by the bottom plate 110.

In an exemplary embodiment, a vertical cross-section of the first sidewall 122 and the second sidewall 124 may have approximately a U-shape, as shown in FIG. 5. Inclined portions of the first sidewall 122 and the second sidewall 124 facing the light-emitting modules 200 may be externally inclined, e.g., may angle or bend away from the bottom plate 110.

As shown in FIG. 6, the third sidewall 126 is formed on a first end portion of a longitudinal axis aligned in the second direction DI2 of the bottom plate 126, and a vertical cross-section thereof may be approximately a U-shape. An inclined portion of the third sidewall 126 facing the light-emitting modules 200 may be externally inclined, e.g., may bend or angle away from the bottom plate 110.

The fourth sidewall 128 is formed on an opposite second end portion of the longitudinal axis aligned in the second direction DI2 of the bottom plate 110 opposite to the first end portion on which the third sidewall 126 is formed. Thus, the fourth sidewall 128 is disposed to face the side mold 400. A vertical cross-section of the fourth sidewall 128 may have a shape which is substantially linear, e.g., is different than shapes of the first, second and third sidewalls 122, 124 and 126, respectively.

The backlight assembly BL according to an exemplary embodiment may further include a reflective sheet 600 disposed on the light-emitting base boards 210 to reflect the light 5 (FIG. 1) generated from the LEDs 220.

As shown in FIG. 6, a plurality of openings, e.g., apertures, is formed through the reflective sheet 600 to expose the LEDs 220. The reflective sheet 600 covers the light-emitting base boards 210, and covers the inclined portions of the first, second and third sidewalls 122, 124 and 126, respectively, as well as the inclined portion of the side mold 400.

Figure 7:
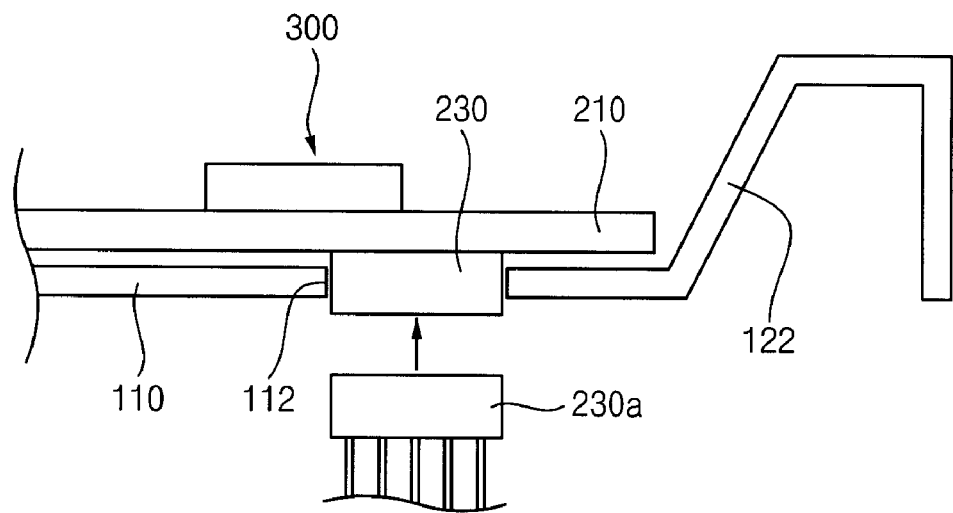
FIG. 7 is a partial cross-sectional view taken along line III-III' in FIG. 2.

FIG. 7 is a partial cross-sectional view taken along line III-III' in FIG. 2.

Referring to FIGS. 2 and 7, a connector 230 for external connection may be disposed on a second face of at least one of the light-emitting base boards 210. In an exemplary embodiment of the present invention, the second face of the light-emitting base board 210 is opposite to the first face of the light-emitting base board 210 on which the driving unit 300 is disposed, as described above in greater detail with reference to FIGS. 2 and 3.

A connector hole 112, e.g., a connector aperture 112, is formed in an area of the bottom plate 110 substantially corresponding to, e.g., proximate to, the connector 230. In other words, the connector 230 is received in the connector hole 112 formed in the bottom plate 110, and is thereby electrically connected to an external cable 230a electrically connected to an external main system (not shown). Thus, the connector 230 receives the driving signal generated from the main system to drive the driving units 300.

The connector 230 may be disposed on the second face of the light-emitting base board 210 disposed at an outer peripheral position of the receiving container 100. Thus, the connector hole 112 may be formed at a left and lower end portion of the bottom plate 110 proximate to an end light-emitting module 200, as shown in FIG. 2.

Figure 8A:
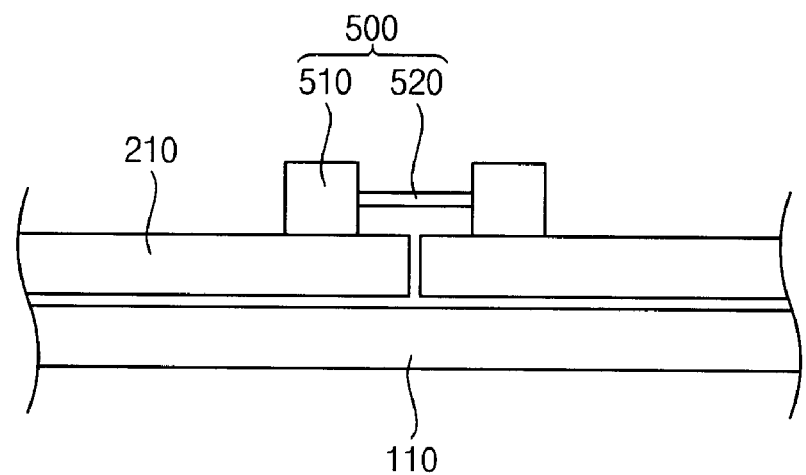
FIGS. 8A and 8B are partial cross-sectional views taken along line IV-IV' in FIG. 2.
Figure 8B:
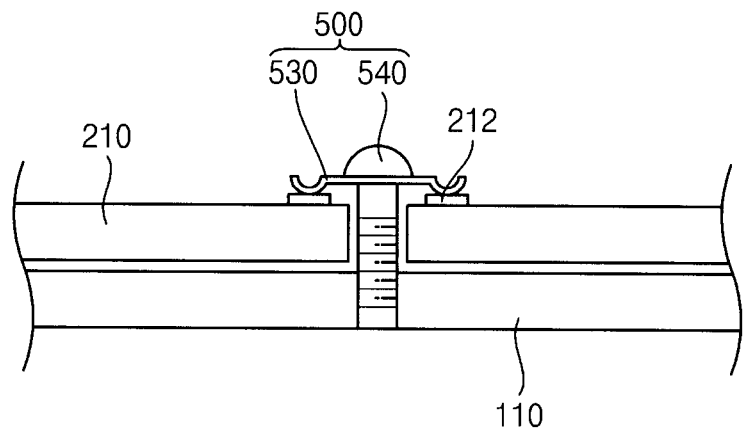

FIGS. 8A and 8B are partial cross-sectional views taken along line IV-IV' in FIG. 2.

Referring to FIG. 8A, the module connecting unit 500 may include wire connectors 510 and a connecting wire 520 disposed between two of the wire connectors 510.

The wire connectors 510 are disposed on the first faces of adjacent light-emitting base boards 210. The connecting wire 520 is coupled to two of the wire connectors 510 to electrically connect the two wire connectors 5 10 to each other, as shown in FIG. 8A.

Referring to FIG. 8B, the module connecting unit 500 according to an alternative exemplary embodiment of the present invention may include a conductive connecting member 530 which makes contact with metal patterns 212 formed on the first faces of the adjacent light-emitting base boards 210 to electrically connect the metal patterns 212 to each other.

The module connecting unit 500 may further include a fixing member 540 which fixes, e.g., attaches, the conductive connecting member 530 to the metal patterns 212. The fixing member 540 may include, for example, a screw 540 which fixes the conductive connecting member 530 to the bottom plate 110, with the metal patterns 212 disposed therebetween, but alternative exemplary embodiments are not limited thereto.

Figure 9:
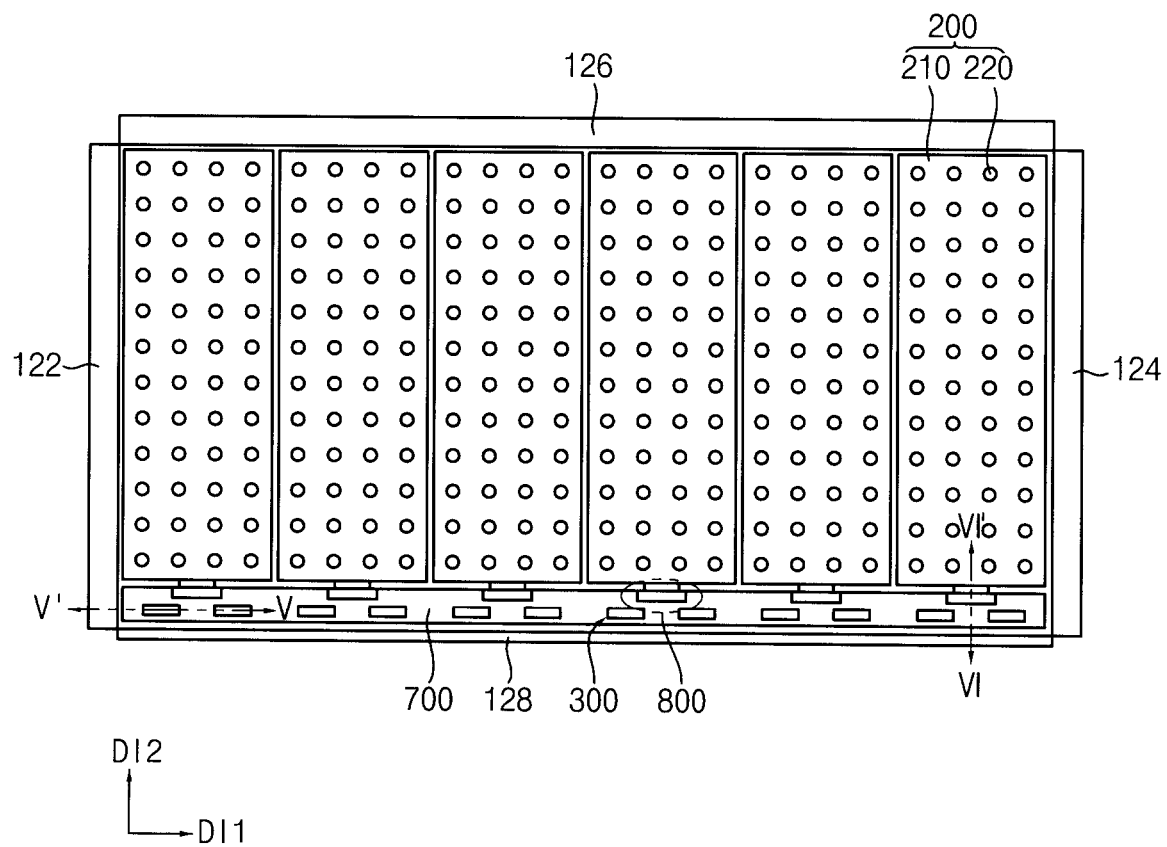
FIG. 9 is a plan view of a backlight assembly of a display device according to an alternative exemplary embodiment of the present invention.
Figure 10:
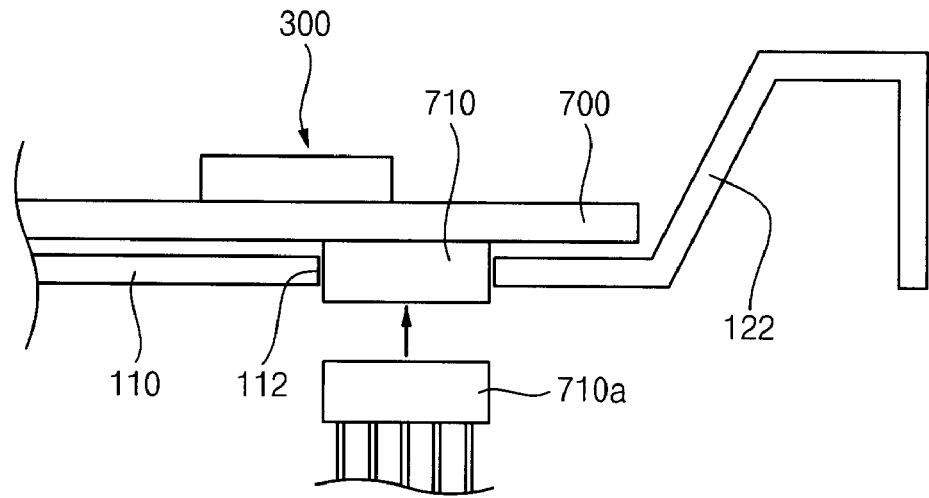
FIG. 10 is a partial cross-sectional view taken along line V-V' in FIG. 9.

FIG. 9 is a plan view of a backlight assembly of a display device according to an alternative exemplary embodiment of the present invention. FIG. 10 is a partial cross-sectional view taken along line V-V' in FIG. 9.

Referring to FIGS. 9 and 10, a display device according to an alternative exemplary embodiment of the present invention includes a backlight assembly BL (FIG. 1) which generates light and a display panel DP (FIG. 1) which displays an image using the light generated from the backlight assembly BL. The display panel DP is substantially the same as the display panel DP illustrated in FIG. 1. The backlight assembly BL is substantially the same as the backlight assembly BL illustrated in FIGS. 1 to 8B, except, e.g., for a driving base board 700 and a board connecting unit 800, which hereinafter be described in further detail with reference to FIGS. 9 and 10.

The same or like elements in FIGS. 1 to 8B are referenced with the same reference numerals in FIGS. 9 and 10, and any repetitive detailed description thereof will hereinafter be omitted.

The backlight assembly BL according to an alternative exemplary embodiment of the present invention further includes a driving base board 700, having the driving units 300 disposed on a first face thereof. Specifically, the driving base board 700 according to an exemplary embodiment may perform substantially the same or like function as the module connecting units 500 illustrated in FIG. 2 and described in greater detail above with reference thereto.

The driving base board 700 is disposed on a peripheral end portion having a longitudinal axis thereof aligned in substantially the second direction DI2 of the bottom plate 110, and is electrically connected to the light-emitting modules 200 through board connecting units 800. In other words, the driving base board 700 is disposed on the bottom plate 110, adjacent to and substantially perpendicular to a longitudinal axis of the light-emitting base boards 210, and extends longitudinally in the second direction DI1.

Referring to FIG. 10, a connector 710 for external connection is disposed on an opposite second face of the driving base board 700, and is received in the connector hole 112 of the bottom plate 110. In an exemplary embodiment, the second face of the driving base board 700 is disposed opposite the first face of the driving base board 700 on which the driving unit 300 is disposed. Further, the connector 710 may be formed at a peripheral end portion, e.g., at a left and lower end portion of the bottom plate 110 (as viewed in FIG. 9).

The connector 710 is received via the connector hole 112, and is electrically connected to an external cable 710a electrically connected to an external main system (not shown), thereby receiving the driving signals generated from the main system.

FIGS. 11A, 11B, 11C and 11D are partial cross-sectional views taken along line VI-VI' in FIG. 9.

Figure 11A:
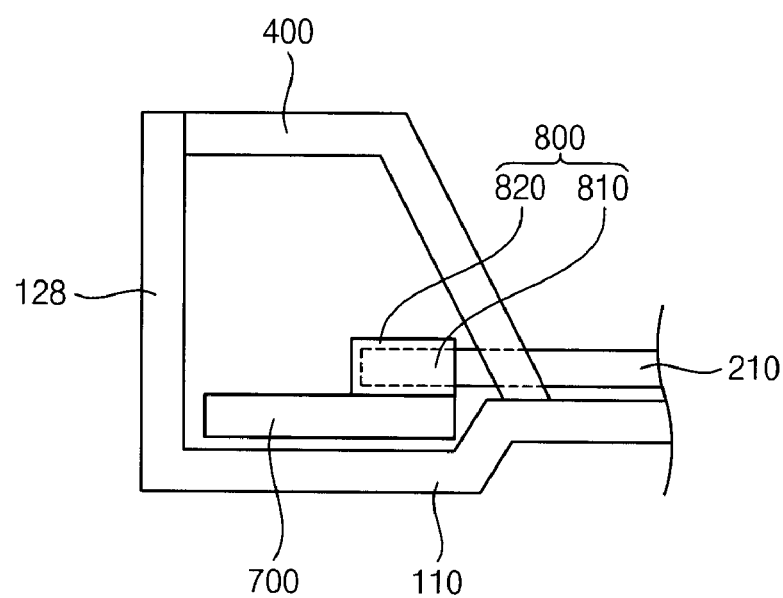
FIGS. 11A, 11B, 11C and 11D are partial cross-sectional views taken along line VI-VI' in FIG. 9.

Referring to FIG. 11A, each of the board connecting units 800 may include a protruding portion 810 and a socket portion 820 combined with the protruding portion 810.

The protruding portion 810 protrudes from the light-emitting base board 210 toward the driving base board 700.

The socket portion 820 is disposed on the driving base board 700 to receive the protruding portion 810, and is electrically connected to the protruding portion 810. In an exemplary embodiment, the socket portion 820 may be disposed on the first face or, alternative, on the second face of the driving base board 700. When the socket portion 820 is disposed on the first face of the driving base board 700, a groove (not shown) may be formed through the bottom plate 110 to receive the driving base board 700.

Figure 11B:
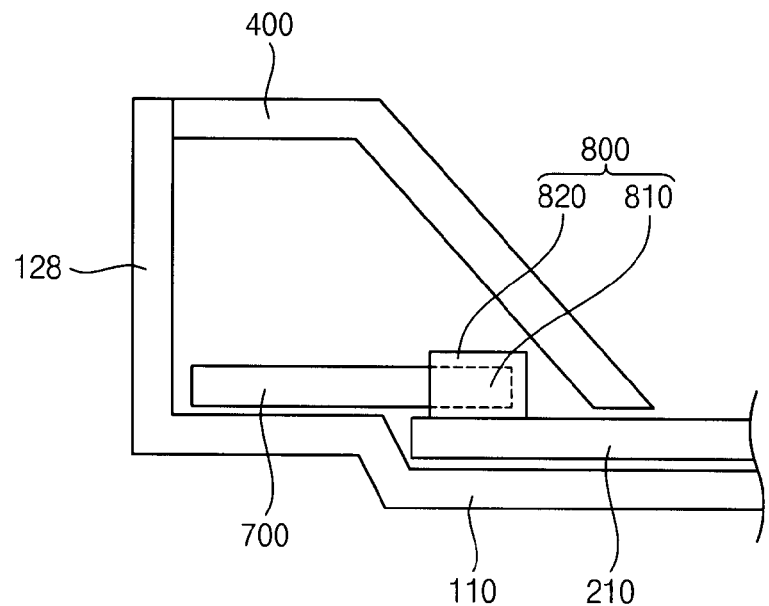

Referring to FIG. 11B, the protruding portion 810 according to an alternative exemplary embodiment may protrude from the driving base board 700 toward the light-emitting base board 210, and the socket portion 820 may be disposed on the light-emitting base board 210 and electrically connected to the protruding portion 810.

Figure 11C:
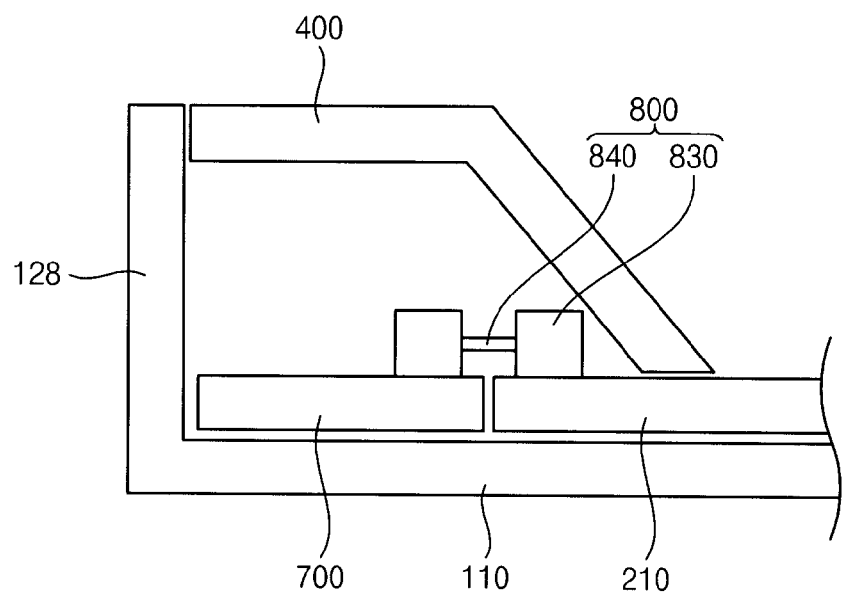

In yet another alternative exemplary embodiment of the present invention shown in FIG. 11C, each of the board connecting units 800 may include wire connectors 830 and a connecting wire 840 disposed therebetween.

The wire connectors 830 are disposed on the first face of the light-emitting base board 210 and the first face of the driving base board 700. More specifically, a first wire connector 830 is disposed on the driving base board 700, while a second wire connector 830 is disposed on the light-emitting base board 210, with the connecting wire 840 connecting the first wire connector 830 to the second wire connector 830, as shown in FIG. 11C, e.g., the connecting wire 840 is coupled to the wire connectors 830 to electrically connect the wire connectors 830 to each other.

Figure 11D:
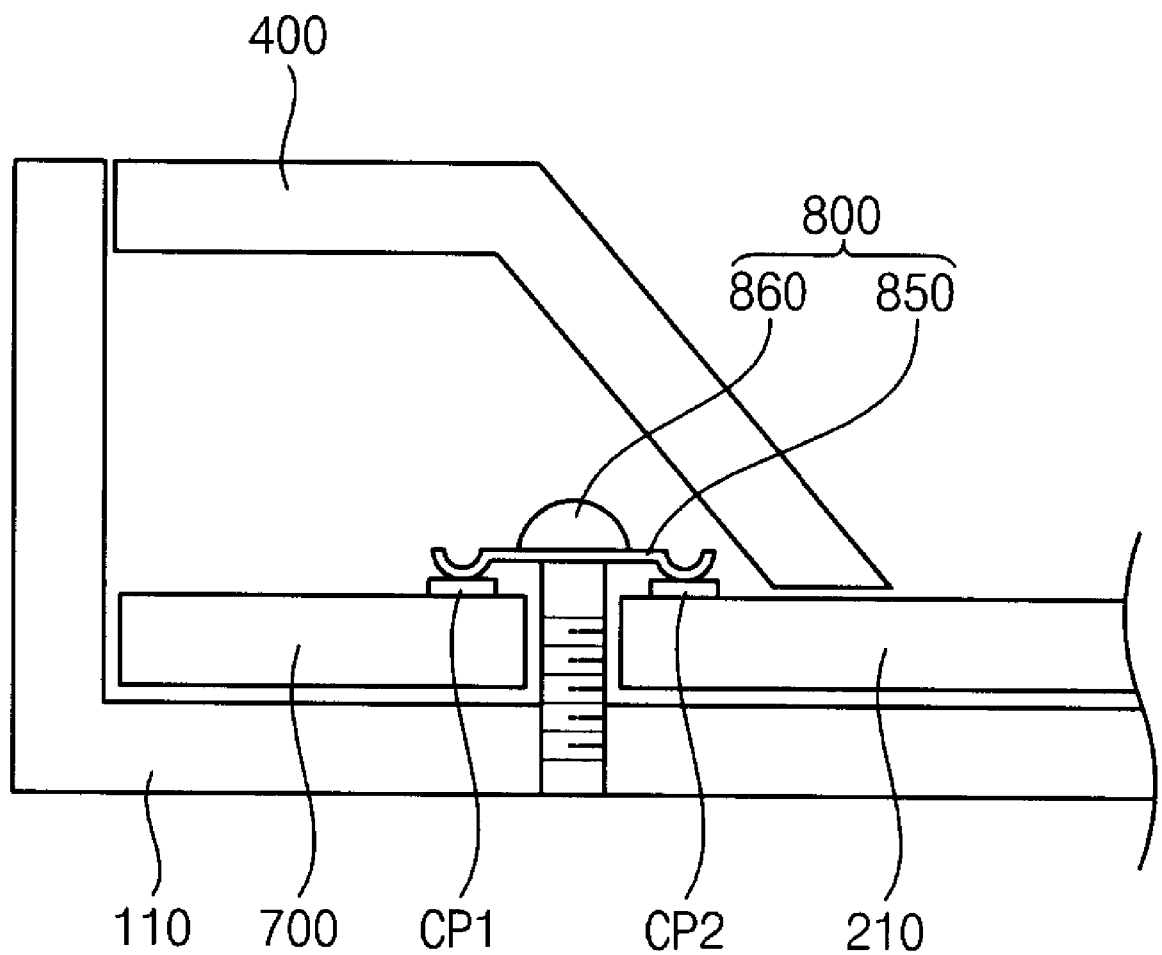

Referring now to FIG. 11D, each of the board connecting units 800 according to an alternative exemplary embodiment of the present invention may include a conductive connecting member 850 which electrically connects the driving base board 700 and the light-emitting base board 210 to each other.

Specifically, the conductive connecting member 850 makes contact with a first metal pattern CP1 formed on the first face of the driving base board 700 and a second metal pattern CP2 formed on the first face of the light-emitting base board 210 to electrically connect the first and second metal patterns CP1 and CP2 to each other.

Each of the board connecting units 800 may further include a fixing member 860 which fixes the conductive connecting member 850 to the bottom plate 110. The fixing member 860 may include, for example, but is not limited thereto, a screw 860 which fixes the conductive connecting member 850 to the bottom plate 110 with both the first metal pattern CP1 and the second metal pattern CP2 disposed therebetween.

As shown in FIGS. 11A, 11B, 11C and 11D, the driving base board 700 and the board connecting units 800 according to exemplary embodiments of the present invention are entirely covered by the side mold 400.

As described herein, driving units 300 which control an operation of LEDs 220 are disposed on a light-emitting base board 210, or, alternatively, on a driving base board 700, and thus external wires may be omitted in a display device according to an exemplary embodiment of the present invention.

Thus, a connection process, as well as a fixing process using tape, for example, required for external wires are eliminated to thereby substantially improve a work and/or manufacturing/production efficiency of the display device, and to further reduce a number of side molds required therein. Therefore, manufacturing costs of a backlight assembly and the display device having the same are substantially reduced.

According to exemplary embodiments of the present invention as described herein, a driving unit which controls an operation of LEDs is disposed in a receiving container to allow external wires to be omitted, thereby improving a manufacturing efficiency and reducing manufacturing costs of a backlight assembly and a display device having the same.

The present invention should not be construed as being limited to the exemplary embodiments set forth herein. Rather, these exemplary embodiments are provided so that this disclosure will be thorough and complete and will fully convey the concept of the present invention to those skilled in the art.

Although exemplary embodiments of the present invention have been particularly shown and described with reference to exemplary embodiments thereof, it will be understood by those of ordinary skill in the art that the present invention should not be limited to these exemplary embodiments but rather that various changes and modifications in form and detail may be made therein without departing from the spirit or scope of the present invention as defined by the following claims.

What is claimed is:

1. A backlight assembly comprising:
a receiving container comprising a bottom plate and a side part formed on a peripheral edge portion of the bottom plate;
a plurality of light-emitting modules disposed in the receiving container, light-emitting modules of the plurality of light-emitting modules comprising a light-emitting base board and a plurality of light-emitting diodes disposed on a first side of the light-emitting base board;
a driving unit disposed in the receiving container proximate to a lower portion of the peripheral edge portion of the bottom plate and electrically connected to the light-emitting modules to control an operation of the plurality of light-emitting diodes; and
a side mold disposed on the lower portion of the peripheral edge portion of the bottom plate to cover the driving unit.

2. The backlight assembly of claim 1, wherein
the light-emitting modules are disposed adjacent to each other along a first direction defined by a longitudinal axis of the receiving container,
a longitudinal axis of the light-emitting modules is aligned in a second direction substantially perpendicular to the first direction,
the lower portion of the bottom plate is proximate to a lower peripheral portion of the longitudinal axis of the light emitting modules, and
the driving unit is disposed on the first side of the light-emitting base board and is electrically connected to light-emitting diodes of the plurality of light-emitting diodes.

3. The backlight assembly of claim 2, further comprising at least one module connecting unit disposed on first sides of adjacent light-emitting base boards to electrically connect the adjacent light-emitting base boards to each other, wherein the at least one module connecting unit is covered by the side mold.

4. The backlight assembly of claim 3, wherein the module connecting unit comprises:
wire connectors disposed on the first sides of the adjacent light-emitting base boards; and
a connecting wire which electrically connects the wire connectors to each other.

5. The backlight assembly of claim 3, wherein the module connecting unit comprises a conductive connecting member in contact with metal patterns formed on the first sides of the adjacent light-emitting base boards to electrically connect the metal patterns to each other.

6. The backlight assembly of claim 2, further comprising
a driving base board disposed on the lower portion of the peripheral edge portion of the bottom plate; and
board connecting units disposed on the driving base board, wherein
the driving unit is disposed on a first side of the driving base board,
the driving base board is electrically connected to the light-emitting modules by the board connecting units,
the driving base board is further disposed on the bottom plate, and
a longitudinal axis of the driving base board is aligned substantially in the first direction.

7. The backlight assembly of claim 6, wherein each of the board connecting units comprises:
a protruding portion protruding from the light-emitting base board toward the driving base board substantially parallel to the second direction; and
a socket portion disposed on the driving base board to receive the protruding portion, wherein the socket portion is electrically connected to the protruding portion.

8. The backlight assembly of claim 6, wherein each of the board connecting units comprises:
a protruding portion protruding from the driving base board toward the light-emitting base board substantially parallel to the second direction; and
a socket portion disposed on the light-emitting base board to receive the protruding portion, wherein the socket portion is electrically connected to the protruding portion.

9. The backlight assembly of claim 6, further comprising a connector disposed on a second side, opposite the first side, of the driving base board and which is disposed in a connector aperture formed in the bottom plate to receive a driving signal for driving the driving unit.

10. The backlight assembly of claim 2, wherein
a shape of the bottom plate is substantially rectangular, and
a length of the bottom plate in the first direction is greater than a length of the bottom plate in the second direction.

11. The backlight assembly of claim 10, wherein
a shape of the light-emitting base board is substantially rectangular, and
a length of the light-emitting base board in the second direction is greater than a length of the light-emitting base board in the first direction.

12. The backlight assembly of claim 1, further comprising a connector disposed on a second side, opposite the first side, of at least one light-emitting base board and disposed in a connector aperture formed in the bottom plate to receive a driving signal for driving the driving unit.

13. The backlight assembly of claim 12, wherein the connector is disposed on the second side of a light-emitting base board disposed at an outermost peripheral position along the first direction of the receiving container.

14. The backlight assembly of claim 1, further comprising:
a driving base board disposed on the lower portion of the peripheral edge portion of the bottom plate; and
board connecting units disposed on the driving base board, wherein
the driving unit is disposed on a first side of the driving base board, and
the driving base board is electrically connected to the light-emitting modules by the board connecting units.

15. The backlight assembly of claim 1, wherein the side part comprises:
a first sidewall formed at a first peripheral side of the bottom plate, a plane defined by the first peripheral side of the bottom plate being substantially perpendicular to a first direction defined by a longitudinal axis of the receiving container;
a second sidewall formed at a second peripheral side the bottom plate opposite the first peripheral side thereof;
a third sidewall formed at a third peripheral side of the bottom plate, a plane defined by the third peripheral side being substantially parallel to the first direction; and
a fourth sidewall formed at a fourth peripheral side the bottom plate opposite the third peripheral side thereof, wherein the fourth sidewall is formed proximate to the side mold, and a cross-section of the fourth sidewall comprises a substantially linear shape.

16. The backlight assembly of claim 15, wherein a cross-section of the first sidewall, the second sidewall and the third sidewall comprises a U-shape.

17. The backlight assembly of claim 15, wherein a cross-section of the side mold comprises an L-shape.

18. The backlight assembly of claim 1, wherein the driving unit comprises a current control section which controls a current supplied to light-emitting diodes of the plurality of light-emitting diodes.

19. The backlight assembly of claim 18, wherein
the driving unit further comprises a voltage changing section which changes a voltage provided from an external source to a driving voltage, and
the voltage changing section supplies the driving voltage to the light-emitting diodes.

20. A display device comprising:
a backlight assembly which generates light; and
a display panel which displays an image using the light, wherein the backlight assembly comprises:
a receiving container comprising a bottom plate and a side part formed on a peripheral edge portion of the bottom plate;
a plurality of light-emitting modules disposed in the receiving container, light-emitting modules of the plurality of light-emitting modules comprising a light-emitting base board and a plurality of light-emitting diodes disposed on a first side of the light-emitting base board;
a driving unit disposed in the receiving container proximate to a lower portion of the peripheral edge portion of the bottom plate and electrically connected to the light-emitting modules to control an operation of the plurality of light-emitting diodes; and
a side mold disposed on the lower portion of the peripheral edge portion of the bottom plate to cover the driving unit.

21. The display device of claim 20, wherein
the light-emitting modules are disposed adjacent to each other along a first direction defined by a longitudinal axis of the receiving container,
a longitudinal axis of the light-emitting modules is aligned in a second direction substantially perpendicular to the first direction,
the lower portion of the bottom plate is proximate to a lower peripheral portion of the longitudinal axis of the light emitting modules,
the driving unit is disposed on the first side of the light-emitting base board and is electrically connected to light-emitting diodes of the plurality of light-emitting diodes,
the backlight assembly further comprises at least one module connecting unit disposed on first sides of adjacent light-emitting base boards to electrically connect the adjacent light-emitting base boards to each other, and
the at least one module connecting unit is covered by the side mold.

22. The display device of claim 20, wherein the side part comprises:
a first sidewall formed at a first peripheral side of the bottom plate, a plane defined by the first peripheral side of the bottom plate being substantially perpendicular to a first direction defined by a longitudinal axis of the receiving container;
a second sidewall formed at a second peripheral side the bottom plate opposite the first peripheral side thereof;
a third sidewall formed at a third peripheral side of the bottom plate, a plane defined by the third peripheral side being substantially parallel to the first direction; and
a fourth sidewall formed at a fourth peripheral side the bottom plate opposite the third peripheral side thereof, wherein the fourth sidewall is formed proximate to the side mold, and a cross-section of the fourth sidewall comprises substantially linear shape.

23. The display device of claim 22, wherein a cross section of the first sidewall, the second sidewall and the third sidewall comprises a U-shape.

24. A method for assembling a backlight assembly comprising:
disposing a driving unit on a bottom plate of a receiving container in a first direction proximate to a side part of the receiving container;
electrically combining a plurality of light-emitting modules with the driving unit in a second direction substantially perpendicular to the first direction, each of the light-emitting modules including a light-emitting base board and a plurality of light-emitting diodes disposed on a first side of the light-emitting base board; and
covering the driving unit with a side mold having a size substantially the same as the size of the driving unit.

* * * * *